US006748207B1

(12) United States Patent
Tochigi et al.

(10) Patent No.: US 6,748,207 B1
(45) Date of Patent: Jun. 8, 2004

(54) POWER DISTRIBUTING AND SYNTHESIZING DEVICE AND MOBILE COMMUNICATION EQUIPMENT USING SAME

(75) Inventors: Makoto Tochigi, Shiga-ken (JP); Tomoya Bando, Omihachiman (JP); Ken Tonegawa, Otsu (JP)

(73) Assignee: Murata Manufacturing Co., Ltd., Kyoto-Fu (JP)

( * ) Notice: Subject to any disclaimer, the term of this patent is extended or adjusted under 35 U.S.C. 154(b) by 525 days.

(21) Appl. No.: 09/671,839

(22) Filed: Sep. 27, 2000

(30) Foreign Application Priority Data

Sep. 27, 1999 (JP) .......................................... 11-272772

(51) Int. Cl.[7] ................................................ H04B 1/16

(52) U.S. Cl. ........................ 455/338; 455/334; 455/327

(58) Field of Search ................................ 455/572, 327, 455/325, 319, 334, 344, 282, 281, 273, 287, 333, 90, 575.1, 550.1, 338, 339, 452, 561; 333/100, 118, 112, 124, 128, 136, 131; 330/124, 310; 327/415; 331/107 SL

(56) References Cited

U.S. PATENT DOCUMENTS

| | | | | | |
|---|---|---|---|---|---|
| 4,812,849 | A | * | 3/1989 | Otto | 342/194 |
| 5,390,337 | A | * | 2/1995 | Jelinek et al. | 455/5.1 |
| 5,596,325 | A | * | 1/1997 | Maas | 342/28 |
| 5,650,756 | A | * | 7/1997 | Hayashi | 333/100 |
| 5,821,831 | A | * | 10/1998 | Marland | 333/132 |
| 5,832,376 | A | * | 11/1998 | Henderson et al. | 455/327 |
| 5,939,939 | A | * | 8/1999 | Gaynor et al. | 330/124 R |
| 6,075,991 | A | * | 6/2000 | Raleigh et al. | 455/450 |
| 6,170,154 | B1 | * | 1/2001 | Swarup | 29/830 |

FOREIGN PATENT DOCUMENTS

| | | | | |
|---|---|---|---|---|
| DE | 2453605 | | 5/1976 | |
| JP | 7263993 | | 10/1995 | |
| JP | 9-46764 | | 2/1997 | |
| JP | 09-046764 | * | 2/1997 | H04Q/7/38 |
| JP | 9-266430 | | 10/1997 | |

OTHER PUBLICATIONS

EP Search Report dated Jul. 30, 2002.
Maeda, M. et al, A Small–Sized 10 W Module for 1.5 GHz Portable DMCA Radios Using New Power Divider/Combiner, IEICE Transactions on Electronics, Institute of Electronics Information and Comm. Eng., Japan, vol. E80–C, No. 6, Jun. 1, 1997.
Japanese Office Action dated Sep. 24, 2002 with English translation.

* cited by examiner

*Primary Examiner*—Edward F. Urban
*Assistant Examiner*—C. Chow
(74) *Attorney, Agent, or Firm*—Dickstein, Shapiro, Morin & Oshinsky LLP.

(57) ABSTRACT

A power distributing and synthesizing device which comprises first to third signal terminals, first and second transmission lines and a resistor. The first signal terminal is provided at the connection portion between one end of the first transmission line and one end of the second transmission line; the second signal terminal is provided at the other end of the first transmission line; and the third signal terminal is provided at the other end of the second transmission line. The resistor is connected between the second signal terminal and the third signal terminal. LC serial resonators each comprising an inductor and a capacitor are respectively connected between the first to third signal terminals and a ground.

8 Claims, 5 Drawing Sheets

POWER DISTRIBUTING AND SYNTHESIZING DEVICE AND MOBILE COMMUNICATION EQUIPMENT USING SAME

BACKGROUND OF THE INVENTION

1. Field of the Invention

The present invention relates to a power distributing and synthesizing device, and more particularly to a power distributing and synthesizing device for distributing or synthesizing high-frequency microwave power in communication equipment.

2. Description of the Related Art

A Wilkinson type power distributing and synthesizing device which distributes or synthesizes high-frequency power in the microwave band, is disclosed in Japanese Unexamined Patent Application Publication No. 7-263993. This device has the advantages of both simplicity of circuit configuration and impedance conversion capability.

FIG. 8 is an equivalent circuit diagram of a conventional Wilkinson type power distributing and synthesizing device: The power distributing and synthesizing device 50 comprises first and second transmission lines 51 and 52, first, second and third signal terminals 531–533, a resistor 54, and capacitors 551–553. The connection portion between one end of the first transmission line 51 and one end of the second transmission line 52 is used as a first signal terminal (synthesis terminal) 531, the other terminal of the first transmission line 51 is used as a second signal terminal (distribution terminal) 532, and the other terminal of the second transmission line 52 is used as a third signal terminal (distribution terminal) 533. The second signal terminal 532 and the third signal terminal 533 are connected via the resistor 54. The first to third signal terminals 531–533 are connected to a ground via the capacitors 551–553.

When the power distributing and synthesizing device 50 is used as a distributor, a high-frequency signal is inputted to the first signal terminal 531, and the inputted high-frequency signal is outputted from the second and third signal terminals 532 and 533. On the other hand, when the power distributing and synthesizing device 50 is used as a synthesizer, high-frequency signals are inputted to the second and third signal terminals 532 and 533, and the inputted high-frequency signals are outputted from the first signal terminal 531.

Here, let the impedance of the circuit to be connected to the first signal terminal 531 be Z1, and the impedance of the circuits to be connected to the second and third signal terminals 532 and 533 be Z23. By setting the characteristic impedance of each of the first and second transmission lines 51 and 52 to $(2 \cdot Z1 \cdot Z23)^{1/2}$, and the length of each of the first and second transmission lines 51 and 52 to λ/4, impedance matching is realized between the power distributing and synthesizing device 50 and the circuits to be connected thereto. Also, by setting the characteristic impedance of the resistor 54 to $2 \cdot Z23$, isolation between the second and third signal terminals 532 and 533 is realized.

However, in the above-described conventional power distributing and synthesizing device 50, since the first to third signal terminals are each connected to the ground via capacitors, it is impossible to remove high-frequency signals at a particular frequency although it is possible to remove higher harmonics of the high-frequency signal inputted to a signal terminal of the power distributing and synthesizing device. As a result, a filter, a trap, or the like needs to be connected to each signal terminal. This requires components for constructing the filters, and raises a problem of inhibiting the size-reduction of the power distributing and synthesizing device.

Furthermore, when the attenuation characteristics of the filter, the trap, or the like to be connected to each of the signal terminals is insufficient, problems occur, in that the isolation between the synthesis terminal and the distribution terminals deteriorates, and that thereby the performance of communication equipment using this power distributing and synthesizing device also deteriorates.

SUMMARY OF THE INVENTION

The present invention is able to solve such problems associated with the conventional art, and to provide a power distributing and synthesizing device capable of removing high-frequency signals at a particular frequency, and at the same time capable of sufficiently securing isolation between the synthesis terminal and the distribution terminals.

To solve the above-described problems, the present invention provides in its first aspect a power distributing and synthesizing device comprising first and second transmission lines; a synthesis terminal constituted of the connection portion between one end of the first transmission line and one end of the second transmission line; a first distribution terminal constituted of the other end of the first transmission line; a second distribution terminal constituted of the other end of the second transmission line; a resistor connected between the first distribution terminal and the second distribution terminal; and at least one LC serial resonator comprising an inductor and a capacitor. In this power distributing and synthesizing device, at least one terminal among the synthesis terminal, the first distribution terminal, and the second distribution terminal is connected to the ground via the at least one LC serial resonator.

Also, the present invention provides in its first aspect a power distributing and synthesizing device further comprising a laminated body formed by laminating a plurality of dielectric layers; strip line electrodes provided within the laminated body; and via hole electrodes provided within the laminated body. In this power distributing and synthesizing device, each of the first and second transmission lines is formed of the strip line electrodes; the inductor is formed of at least one of a strip line electrode and a via hole electrode; and the capacitor is formed of a plurality of electrodes formed within the laminated body so as to be opposed to each other across the dielectric layers.

The present invention provides in its second aspect a power distributing and synthesizing device comprising first and second transmission lines; a synthesis terminal constituted of the connection portion between one end of the first transmission line and one end of the second transmission line; a first distribution terminal constituted of the other end of the first transmission line; a second distribution terminal constituted of the other end of the second transmission line; a resistor connected between the first distribution terminal and the second distribution terminal; and at least one LC serial resonator comprising an inductor and a capacitor. In this power distributing and synthesizing device, a capacitor is connected in parallel with at least one of the first and second transmission lines.

Also, the present invention provides in its second aspect a power distributing and synthesizing device further comprising a laminated body formed by laminating a plurality of dielectric layers; and strip line electrodes provided within the laminated body. In this power distributing and synthesizing device, each of the first and second transmission lines is formed of the strip line electrodes; and the capacitor is formed of a plurality of electrodes formed within the laminated body so as to be opposed to each other across the dielectric layers.

Furthermore, in the power distributing and synthesizing device in according with the present invention, each of the strip line electrodes forming said first and second transmission lines may have a helical coil shape.

In the power distributing and synthesizing device in accordance with the first aspect of the present invention, since an LC serial resonator is connected between at least one terminal among the synthesis terminal, the first distribution terminal, and the second distribution terminal and the ground, it is possible to generate an attenuation pole by a serial resonance of the LC serial resonator, in the vicinity of the resonance frequency of an inputted signal. This allows high-frequency signals in the vicinity of the resonance frequency to be removed.

In the power distributing and synthesizing device in accordance with the second aspect of the present invention, since a capacitor is connected in parallel with at least one of the first and second transmission lines, it is possible to generate an attenuation pole by a parallel resonance of the LC parallel resonator comprising at least one of the first and second transmission lines and a capacitor, in the vicinity of the resonance frequency of an inputted signal. This allows high-frequency signals in the vicinity of the resonance frequency to be removed.

The mobile communication equipment in accordance with the present invention uses the above-described power distributing and synthesizing device.

In the mobile communication equipment in accordance with the present invention, since the power distributing and synthesizing device is capable of securing sufficient isolation between the synthesis terminal and the distribution terminals, and allows a cost reduction and a reduction in size, it is possible to achieve a small-sized transmitter which is superior in characteristics.

The above and other features and advantages of the present invention will be apparent from the following detailed description of several embodiments of the invention in conjunction with the accompanying drawings.

DESCRIPTION OF EMBODIMENTS OF THE INVENTION

Figure 1:
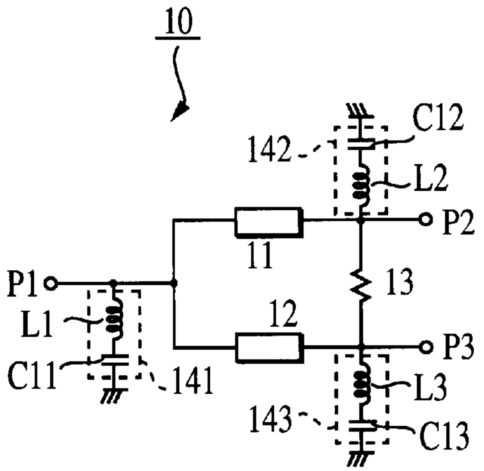
FIG. 1 is an equivalent circuit diagram of a power distributing and synthesizing device in accordance with a first embodiment of the present invention.

FIG. 1 is an equivalent circuit diagram of a power distributing and synthesizing device in accordance with a first embodiment. The power distributing and synthesizing device 10 comprises first to third signal terminals P1–P3, first and second transmission lines 11 and 12, a resistor 13, and LC serial resonators 141–143. Here, the LC serial resonators 141–143 comprise inductors L1–L3 and capacitors C11–C13, respectively.

One end of the first transmission line 11 and one end of the second transmission line 12 are connected, and the connection portion thereof is used as the first signal terminal (synthesis terminal) P1. The other end of the first transmission line 11 is used as the second signal terminal (distribution terminal) P2, and the other end of the second transmission line 12 is used as the third signal terminal (distribution terminal) P3.

A resistor (isolation resistor) 13 is connected between the second signal terminal P2 and the third signal terminal P3. LC serial resonators 141–143 are connected between the respective first to third signal terminals P1–P3 and the ground.

Figure 2:
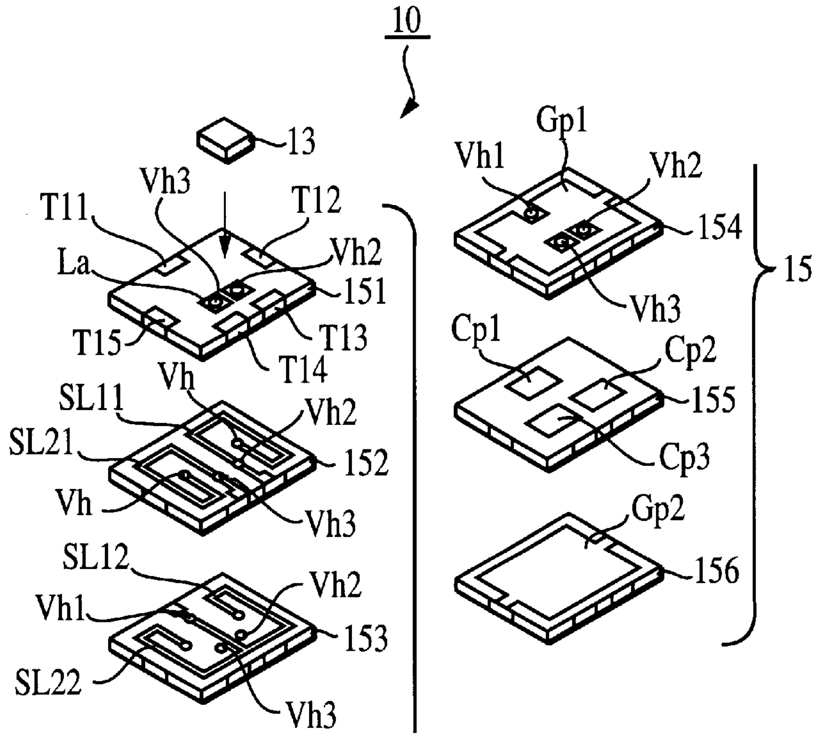
FIG. 2 is an exploded perspective view of a power distributing and synthesizing device having the equivalent circuit shown in FIG. 1.

FIG. 2 is an exploded perspective view of a power distributing and synthesizing device having the equivalent circuit shown in FIG. 1. The power distributing and synthesizing device 10 has a laminated body 15, and a resistor 13 is mounted on the top surface of the laminated body 15. External terminals T11–T15 are each provided from the top surface to the bottom surface of the laminated body 15. Here, the external terminals T11, T13, and T14 constitute the first to third signal terminals P1–P3 (FIG. 1) of the power distributing and synthesizing device 10, respectively, and the external terminals T12 and T15 constitute ground terminals.

The laminated body 15 is formed by, for example, sequentially laminating first to sixth dielectric layers 151–156 constituted of a low-temperature fired ceramic of which main constituents are barium oxide, aluminum oxide, and silica, and which can be fired at 850° C. to 1000° C., and then firing the laminated dielectric layers.

A land La for mounting the resistor 13 is formed on the top surface of the first dielectric layer 151. Strip line electrodes SL11 and SL21, and strip line electrodes SL21 and SL22 each of which has a helical coil shape are formed on the top surfaces of the second and third dielectric layers 152 and 153, respectively.

Ground electrodes Gp1 and Gp2 are formed on the top surfaces of the fourth and sixth dielectric layers 154 and 156, respectively. Capacitor electrodes Cp1–Cp3 are formed on the top surface of the fifth dielectric layer 155.

A via hole electrode Vh1 is formed in each of the third and fourth dielectric layers 153 and 154 so as to pass through the dielectric layers 153 and 154, and via hole electrodes Vh2 and Vh3 are each formed in the first to fourth dielectric layers 151–154 so as to pass through the dielectric layers 151–154. Also, a via hole electrode Vh is formed in the second dielectric layer 152 so as to pass through the dielectric layers 152.

The strip line electrodes SL11, SL12 and the via hole electrode Vh form the first transmission line 11 (FIG. 1), and the strip line electrodes SL21, SL22 and the via hole electrode Vh form the second transmission line 12 (FIG. 1).

The via hole electrode Vh1 passing through the third and fourth dielectric layers 153 and 154 forms the inductor L1 of the LC serial resonator 141, and the via hole electrodes Vh2 and Vh3 passing through the first to fourth dielectric layers 151 and 154 form the inductors L2 and L3 of the LC serial resonators 142 and 143, respectively.

Also, the capacitor electrodes Cp1–Cp3 and the ground electrodes Gp1 and Gp2 which are opposed to each other across the fourth dielectric layers 154 and across the fifth dielectric layer 155, form the capacitors C11–C13 of the LC serial resonators 141–143. Here, the ground electrodes Gp1 and Gp2 constitute another capacitor electrode.

Figure 3:
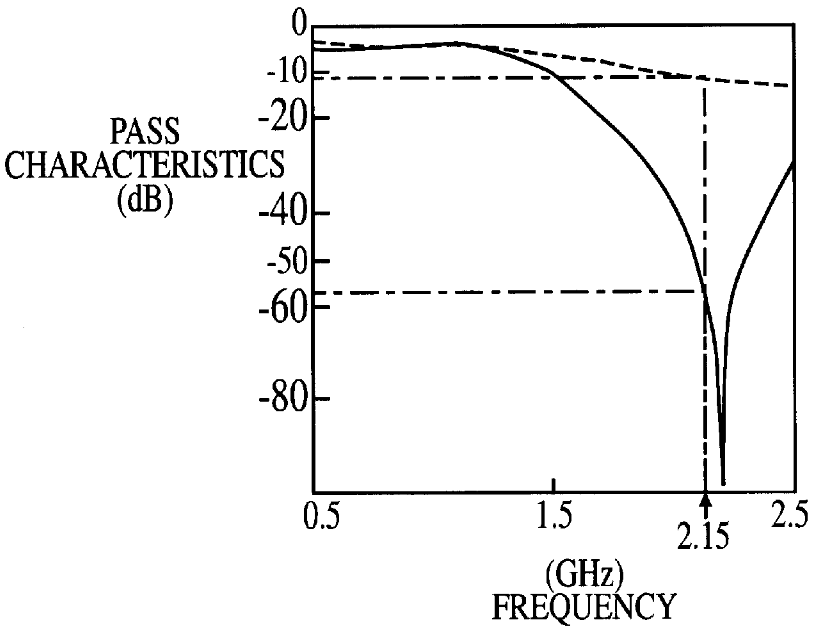
FIG. 3 is a diagram illustrating the pass characteristics of the power distributing and synthesizing device shown in FIG. 2.
Figure 8:
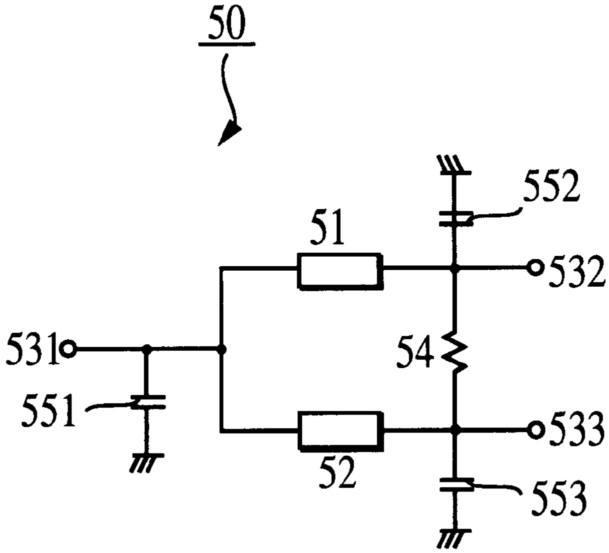
FIG. 8 PRIOR ART
FIG. 8 is an equivalent circuit diagram of a conventional power distributing and synthesizing device.

FIG. 3 illustrates the pass characteristics of the power distributing and synthesizing device shown in FIG. 2. In FIG. 3, the solid line represents the pass characteristics of the power distributing and synthesizing device 10 in accordance with the present embodiment (FIG. 1), and the broken line represents those of the conventional power distributing and synthesizing device 50 (FIG. 8).

It can be seen from this figure (solid line) that in the power distributing and synthesizing device 10 in accordance with this embodiment, the attenuation pole due to the serial resonance of the LC serial resonators 141–143 occurs in the vicinity of the resonance frequency, 2.15 GHz and that the attenuation value at the resonance frequency is about 56.9 dB. This attenuation value is about 4.5 times larger than that of the conventional power distributing and synthesizing device 50 (broken line) of which the attenuation value is about 12.7 dB.

In the power distributing and synthesizing device in accordance with the above-described first embodiment, since the LC serial resonators are connected between the first to third signal terminals and the ground, the attenuation pole caused by the serial resonance of the LC serial resonators can be generated in the vicinity of the resonance frequency. This allows high-frequency signals in the vicinity of the resonance frequency to be removed, and thereby provides sufficient isolation between the first and second signal terminals, or between the first and third signal terminals.

Furthermore, by changing the value of the inductor and capacitor constituting each of the LC serial resonators, the position of the attenuation pole formed by the serial resonance of the LC serial resonators can be easily changed. This permits high-frequency signals having an intended frequency to be removed in the power distributing and synthesizing device, and thereby permits the isolation between the synthesis terminal and distribution terminals to be sufficiently secured.

Moreover, the first embodiment of the present invention has a laminated body formed by laminating the first to sixth dielectric layers, forms each of the first and second transmission lines of strip line electrodes provided within the laminated body, forms the inductor constituting each of the LC serial resonators of a via hole electrode provided within the laminated body, and forms the LC serial resonator of a plurality of the electrodes provided within the laminated body so as to be opposed to each other across the dielectric layers. Therefore, the number of components of the power distributing and synthesizing device can be reduced. This results in a cost reduction and a reduction in size of the power distributing and synthesizing device. In particular, when forming the inductor constituting the LC serial resonator of a via hole electrode provided in the height direction within the laminated body, since the size of the power distributing and synthesizing device in the planar direction is further reduced, the mounting surface thereof can be decreased.

Furthermore, since each of the strip line electrodes forming the first and second transmission lines has a helical coil shape, the flux generated by the current flowing through the first and second transmission lines is large, and hence the self inductances of the first and second transmission lines are large. As a result, since the overall length of the first and second transmission lines can be shorter than $\lambda/4$, the loss of the power distributing and synthesizing device can be decreased and the size of the power distributing and synthesizing device can be further reduced.

Figure 4:
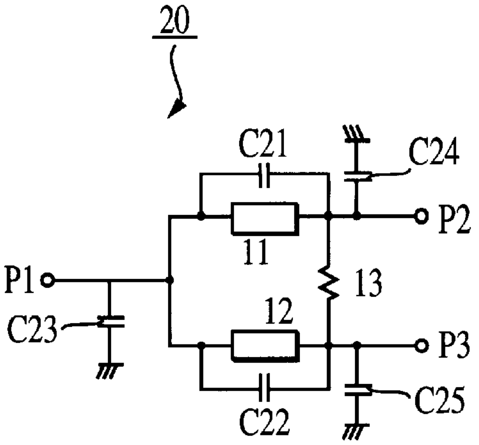
FIG. 4 is an equivalent circuit diagram of a power distributing and synthesizing device in accordance with a second embodiment of the present invention.

FIG. 4 is an equivalent circuit diagram of a power distributing and synthesizing device in accordance with a second embodiment. The power distributing and synthesizing device 20 comprises first to third signal terminals P–P3, first and second transmission lines 11 and 12, resistor 13, and capacitors C21–C25.

One end of the first transmission line 11 and one end of the second transmission line 12 are connected, and the connection portion thereof is used as a first signal terminal (synthesis terminal) P1. The other end of the first transmission line 11 is used as a second signal terminal (distribution terminal) P2, and the other end of the second transmission line 12 is used as a third signal terminal (distribution terminal) P3.

A resistor (isolation resistor) 13 is connected between the second signal terminal P2 and the third signal terminal P3. Also, a capacitor 21 is connected in parallel with the first transmission line 11, a capacitor 22 is connected in parallel with the second transmission line 12, and capacitors 23–25 are connected respectively between the first to third signal terminals P1–P3 and the ground.

Figure 5:
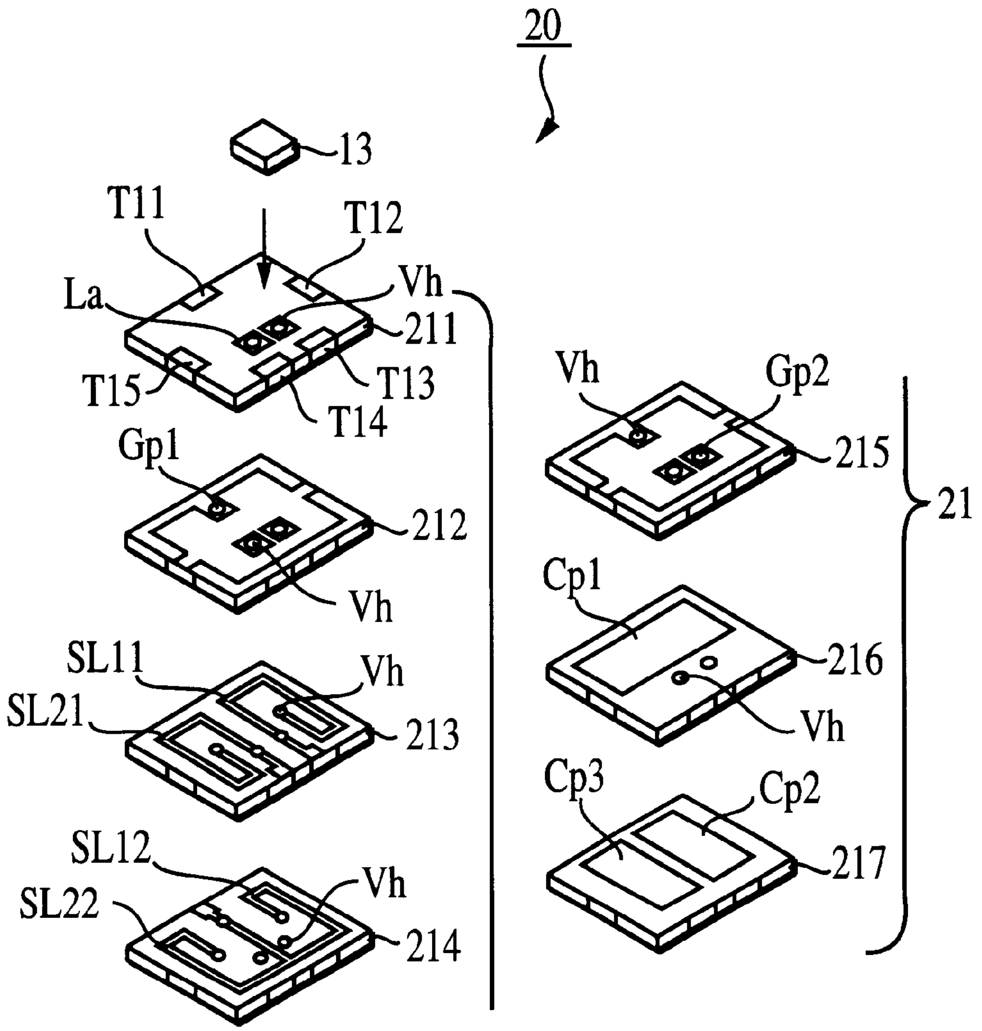
FIG. 5 is an exploded perspective view of a power distributing and synthesizing device having the equivalent circuit shown in FIG. 4.

FIG. 5 is an exploded perspective view of a power distributing and synthesizing device having the equivalent circuit shown in FIG. 4. The power distributing and synthesizing device 20 has a laminated body 21, and a resistor 13 is mounted on the top surface of the laminated body 21. External terminals T11–T15 are each provided from the top surface to the bottom surface of the laminated body 21. Here, the external terminals T11, T13 and T14 constitute the first to third signal terminals P1–P3 (FIG. 4) of the power distributing and synthesizing device 20, respectively, and the external terminals T12 and T15 constitute ground terminals.

The laminated body 21 is formed by, for example, sequentially laminating first to seventh dielectric layers 211–217 constituted of a low-temperature fired ceramic of which main constituents are barium oxide, aluminum oxide, and silica, and which can be fired at 850° C. to 1000° C.

A land La for mounting the resistor 13 is formed on the top surface of the first dielectric layer 211. Ground electrodes Gp1 and Gp2 are formed on the top surfaces of the second and fifth dielectric layers 212 and 215, respectively.

Strip line electrodes SL11 and SL21, and strip line electrodes SL12 and SL22 each of which has a helical coil shape are formed on the top surfaces of the third and fourth dielectric layers 213 and 214, respectively. Capacitor electrodes Cp1–Cp3 are formed on the top surfaces of the sixth and seventh dielectric layer 216 and 217. A via hole electrode Vh is formed in each of the first to sixth dielectric layers 211–216 so as to pass through the dielectric layers 211 and 216.

The strip line electrodes SL11, SL12 and the via hole electrode Vh form the first transmission line 11 (FIG. 4), and the strip line electrodes SL21, SL22 and the via hole electrode Vh form the second transmission line 12 (FIG. 4). Also, the capacitor electrodes Cp1 and Cp2 opposed to each other across the sixth dielectric layer 216, and the capacitor electrodes Cp1 and Cp3 opposed to each other across the sixth dielectric layer 216, form the capacitors C21 and C22, respectively.

Moreover, the strip line electrodes SL21, SL22 and the ground electrode Gp2 form the capacitor C23, the strip line electrode SL11 and the ground electrode Gp1 form the capacitor C24, and the strip line electrode SL21 and the ground electrode Gp1 form the capacitor C25.

Figure 6:
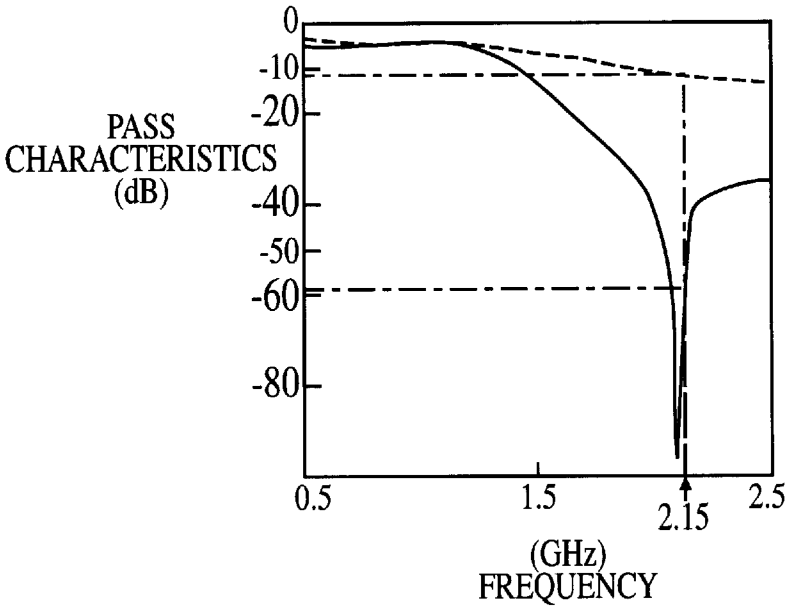
FIG. 6 is a diagram illustrating the passing characteristics of the power distributing and synthesizing device shown in FIG. 5.

FIG. 6 illustrates the pass characteristics of the power distributing and synthesizing device shown in FIG. 4. In FIG. 6, the solid line represents the pass characteristics of the power distributing and synthesizing device 20 (FIG. 4), and the broken line represents those of the conventional power distributing and synthesizing device 50 (FIG. 8).

It can be seen from this figure (solid line) that in the power distributing and synthesizing device 20 in accordance with this embodiment, the attenuation pole caused by the parallel resonance of the LC parallel resonators comprising the first and second transmission lines and the corresponding capacitors occurs in the vicinity of the resonance frequency, 2.15 GHz and that the attenuation value at the resonance frequency is about 56.1 dB. This attenuation value is about 4.4 times larger than that of the conventional power distributing and synthesizing device 50 (broken line) of which the attenuation value is about 12.7 dB.

In accordance with the above-described second embodiment of the power distributing and synthesizing device, since capacitors are connected in parallel with the first and second transmission lines, the attenuation pole due to the parallel resonance of the LC parallel resonators comprising the first and second transmission lines and the corresponding capacitors, can be generated in the vicinity of the resonance frequency. This allows high-frequency signals in the vicinity of the resonance frequency to be removed, and thereby allows the isolation between the first and second signal terminals, or between the first and third signal terminals to be sufficiently secured.

Furthermore, by changing the values of the capacitors connected in parallel with the first and second transmission lines, the position of the attenuation pole formed by the parallel resonance of the LC parallel resonators can be easily changed. This permits high-frequency signals having an intended frequency to be removed by the power distributing and synthesizing device, and thereby permits the isolation between the synthesis terminal and distribution terminals to be sufficiently secured.

Moreover, the second embodiment of the present invention has a laminated body formed by laminating the first to seventh dielectric layers, forms each of the first and second transmission lines of strip line electrodes provided within the laminated body, and forms each of the capacitors to be connected in parallel with the first and second transmission lines of a plurality of the electrodes provided within the laminated body so as to be opposed to each other across the dielectric layer. Therefore, the number of components of the power distributing and synthesizing device can be reduced. This results in a cost-reduction and a reduction in size of the power distributing and synthesizing device.

Furthermore, since each of the strip line electrodes forming the first and second transmission lines has a helical coil shape, the flux generated by the current flowing through the first and second transmission lines is large, and hence the self inductances of the first and second transmission lines are large. As a result, since the overall length of the first and second transmission lines can be shorter than $\lambda/4$, the loss of the power distributing and synthesizing device can be decreased and the size of the power distributing and synthesizing device can be further reduced.

Figure 7:
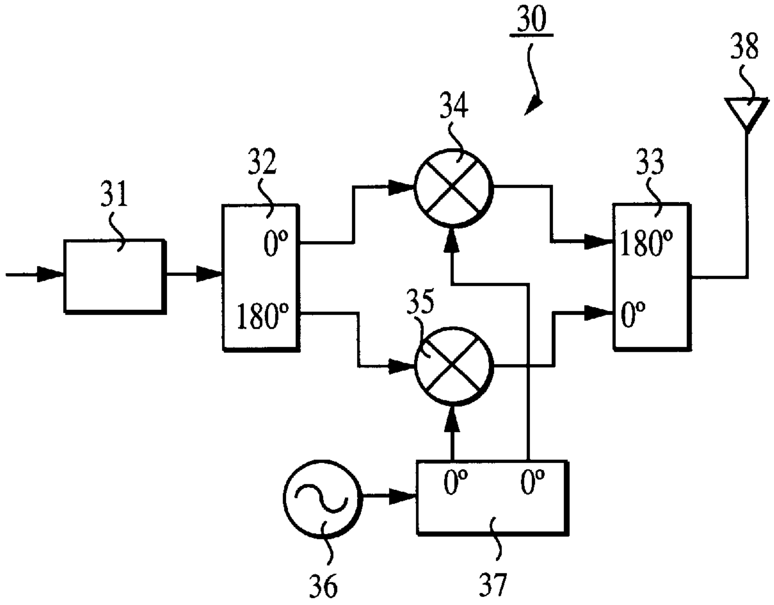
FIG. 7 is a block diagram showing a transmitter which is typical mobile communication equipment.

FIG. 7 is a block diagram showing an example of typical mobile communication equipment. A transmitter 30 which is an example of mobile communication equipment comprises a modulation circuit 31, 180° hybrid circuits 32 and 33, mixers 34 and 35, a local oscillator 36, in-phase distributor 37, and an antenna 38.

A baseband signal including an information signal to be transmitted is inputted to the modulation circuit 31, and the modulation circuit 31 outputs the modulation signal modulated by a predetermined modulation method such as the amplitude modulation or the frequency modulation to the 180° hybrid circuit 32. The 180° hybrid circuit 32 distributes the inputted signal as two signals having phases opposite to each other, and outputs one signal to the mixer 34, and outputs the other signal to the mixer 35.

The local oscillator 36 generates a predetermined local oscillation signal, and outputs it to the in-phase distributor 37. The in-phase distributor 37 in-phase distributes the inputted local oscillation signal as two signals, and outputs the two signals respectively to the mixer 34 and 35.

The mixer 34 mixes the two signals inputted thereto, and outputs them to the 180° input terminal of the 180° hybrid circuit 33. The mixer 35 mixes the two signals inputted thereto, and outputs them to the 0° input terminal of the 180° hybrid circuit 33.

The 180° hybrid circuit 33 power-synthesizes the two inputted signals in phases opposite to each other, and outputs the synthesized signal to the antenna 38 to emit.

For the in-phase distributor 37 in the transmitter 30 having the above-described construction, the power distributing and synthesizing devices 10 and 20 shown in FIGS. 1 and 4, respectively, can be used.

In this transmitter which is one type of mobile communication equipment, since the power distributing and synthesizing device is capable of sufficiently securing the isolation between the synthesis terminal and the distribution terminals, and allowing a cost reduction and a reduction in size, a small sized transmitter which is superior in characteristics can be achieved.

In the above-described embodiments of the power distributing and synthesizing devices, each of the dielectric layers is constituted of a ceramic whose main constituents are barium oxide, aluminum oxide, and silica. However, any material having a dielectric constant ($\epsilon r$) not less than 1 can be used. For example, even a ceramic whose main constituents are magnesium oxide and silica, or a fluorine base resin, also provide a similar effect.

Also, only two distribution terminals are used, as shown in the equivalent circuits in FIGS. 1 and 4. However, more than two distribution terminals may be employed.

In the disclosed embodiments, the inductors and capacitors are provided within the laminated layer. Alternatively, however, the present invention may be constructed of chip inductors or chip capacitors.

Also, the disclosed power distributing and synthesizing device is used as an in-phase distributor in a transmitter, which is one example of mobile communication equipment. The power distributing and synthesizing device may, however, be used as an in-phase distributor in a receiver. In this case also, a similar effect can be provided.

As described hereinabove, in the power distributing and synthesizing device in accordance with the first aspect of the present invention, since the LC serial resonators are connected between the first to third signal terminals and the ground, the attenuation pole due to the serial resonance of the LC serial resonators can be generated in the vicinity of the resonance frequency. This allows high-frequency signals in the vicinity of the resonance frequency to be removed, and thereby allows the isolation between the synthesis terminal and distribution terminals to be sufficiently secured.

Furthermore, by changing the value of the inductor and capacitor constituting each of the LC serial resonators, the position of the attenuation pole formed by the serial resonance of the LC serial resonators can be easily changed. This allows high-frequency signals having an intended frequency to be removed in the power distributing and synthesizing device, and thereby allows the isolation between the synthesis terminal and distribution terminals to be sufficiently secured.

Also, the power distributing and synthesizing device in accordance with the first aspect of the present invention has a laminated body formed by laminating a plurality of the dielectric layers, forms each of the first and second transmission lines of strip line electrodes provided within the laminated body, forms the inductor constituting each of the LC serial resonators of one of strip line electrode and via hole electrode provided within the laminated body, and forms the capacitor constituting each of the LC serial resonators of a plurality of the electrodes provided within the laminated body so as to be opposed to each other across the dielectric layers. Therefore, the number of components of the power distributing and synthesizing device can be reduced. This results in a cost-reduction and a reduction in size of the power distributing and synthesizing device.

In the power distributing and synthesizing device in accordance with the second aspect of the present invention, since capacitors are connected in parallel with the first and second transmission lines, the attenuation pole formed by the parallel resonance of the LC parallel resonators comprising the first and second transmission lines and their capacitors, can be generated in the vicinity of the resonance frequency. This allows high-frequency signals in the vicinity of the resonance frequency to be removed.

Furthermore, by changing the values of the capacitors connected in parallel with the first and second transmission lines, the position of the attenuation pole formed by the parallel resonance of the LC parallel resonators comprising the first and second transmission lines and their capacitors, can be easily changed. This allows high-frequency signals having an intended frequency to be removed in the power distributing and synthesizing device, and thereby allows the isolation between the synthesis terminal and distribution terminals to be sufficiently secured.

Moreover, the power distributing and synthesizing device in accordance with the second aspect of the present invention has a laminated body formed by laminating a plurality of the dielectric layers, forms each of the first and second transmission lines of strip line electrodes provided within the laminated body, and forms each of the capacitors connected in parallel with the first and second transmission lines of a plurality of the electrodes provided within the laminated body so as to be opposed to each other across the dielectric layer. Therefore, the number of components of the power distributing and synthesizing device can be reduced. This results in a cost-reduction and a reduction in size of the power distributing and synthesizing device.

Furthermore, in the power distributing and synthesizing device in accordance with the present invention, since each of the strip line electrodes forming the first and second transmission lines has a helical coil shape, the flux generated by the current flowing through the first and second transmission lines is large, and hence the self inductances of the first and second transmission lines are large. As a result, since the overall length of the first and second transmission lines can be shorter than $\lambda/4$, the loss of the power distributing and synthesizing device can be decreased and the size of the power distributing and synthesizing device can be further reduced.

In the mobile communication equipment in accordance with the third aspect of the present invention, since the power distributing and synthesizing device is capable of sufficiently securing isolation between the synthesis terminal and the distribution terminals, and which allows a cost reduction and a reduction in size, a small sized transmitter which is superior in characteristics can be achieved.

While the invention has been described in connection with embodiments thereof, many modifications and variations of the present invention are possible in the light of the above teachings. It is therefore to be understood that within the scope of the appended claims, the invention may be practiced otherwise than as specifically described.

What is claimed is:

1. A power distributing and synthesizing device, comprising:

- a laminated body formed by a plurality of laminated dielectric layers;
- strip line electrodes provided within said laminated body and forming first and second transmission lines;
- first and second ground electrodes provided within said laminated body, said first ground electrode being provided adjacent to a bottom surface of said laminated body;
- via hole electrodes provided within said laminated body;
- a synthesis terminal constituted of the connection portion between one end of said first transmission line and one end of said second transmission line;
- a first distribution terminal constituted of the other end of said first transmission line;
- a second distribution terminal constituted of the other end of said second transmission line;
- a resistor connected between said first distribution terminal and said second distribution terminal; and
- at least one LC serial resonator comprising an inductor and a capacitor, wherein:
  - at least one terminal among said synthesis terminal, said first distribution terminal, and said second distribution terminal is connected to a ground via said at least one LC serial resonator,
  - said inductor is formed of at least one of said strip line electrodes and said via hole electrodes,
  - said capacitor of the at least one LC serial resonator is generated between a capacitor electrode and the first ground electrode, the capacitor electrode being opposed to the first ground electrode, and
  - the second ground electrode is provided between the strip line electrodes and the capacitor electrode.

2. A power distributing and synthesizing device as claimed in claim 1, wherein:

- each of said synthesis terminal, said first distribution terminal, and said second distribution terminal is connected to the ground via said at least one LC serial resonator.

3. A power distributing and synthesizing device as claimed in claim 1, wherein:

- said resistor is a surface mount resistor; and said resistor is mounted on the surface of said laminated body.

4. A power distributing and synthesizing device as claimed in claim 1, wherein:

each of the strip line electrodes forming said first and second transmission lines has a helical coil shape.

5. A power distributing and synthesizing device, comprising:

a laminated body formed by laminating a plurality of dielectric layers;

strip line electrodes provided within said laminated body and forming first and second transmission lines;

a ground electrode provided within said laminated body;

a synthesis terminal constituted of the connection portion between one end of said first transmission line and one end of said second transmission line;

a first distribution terminal constituted of the other end of said first transmission line;

a second distribution terminal constituted of the other end of said second transmission line;

a resistor connected between said first distribution terminal and said second distribution terminal; and at least one capacitor, wherein:

said at least one capacitor is connected in parallel with at least one of said first and second transmission lines, said at least one capacitor is formed of a set of capacitor electrodes provided within said laminated body so as to be opposed to each other across said dielectric layers, and said ground electrode is provided between said set of capacitor electrodes and said strip line electrodes.

6. A power distributing and synthesizing device as claimed in claim 5, wherein:

a respective capacitor is connected in parallel with each of said first and second transmission lines.

7. A power distributing and synthesizing device as claimed in claim 5, wherein:

said resistor is a surface mount resistor; and said resistor is mounted on the surface of said laminated body.

8. A power distributing and synthesizing device as claimed in claim 5, wherein:

each of the strip line electrodes forming said first and second transmission lines has a helical coil shape.

* * * * *